(12) United States Patent
Bielecki et al.

(10) Patent No.: US 10,280,966 B2
(45) Date of Patent: May 7, 2019

(54) HIGH SECURITY FASTENER WITH INTERNAL SHROUD BUCKLED RETAINER

(71) Applicant: McGard LLC, Orchard Park, NY (US)

(72) Inventors: Dustin D. Bielecki, Sloan, NY (US); Daniel Tornow, Boston, NY (US); Dillon Jones, Amherst, NY (US); David C. Meyer, Boston, NY (US)

(73) Assignee: McGard LLC, Orchard Park, NY (US)

( * ) Notice: Subject to any disclaimer, the term of this patent is extended or adjusted under 35 U.S.C. 154(b) by 133 days.

(21) Appl. No.: 15/434,042

(22) Filed: Feb. 15, 2017

(65) Prior Publication Data

US 2017/0234358 A1 Aug. 17, 2017

Related U.S. Application Data

(60) Provisional application No. 62/420,246, filed on Nov. 10, 2016, provisional application No. 62/295,983, filed on Feb. 16, 2016.

(51) Int. Cl.
F16B 39/02 (2006.01)
F16B 23/00 (2006.01)
(Continued)

(52) U.S. Cl.
CPC ........ F16B 39/025 (2013.01); F16B 23/0007 (2013.01); F16B 37/14 (2013.01);
(Continued)

(58) Field of Classification Search
CPC ...... F16B 23/00; F16B 23/0007; F16B 37/14; F16B 39/02; F16B 39/025; F16B 39/12; F16B 39/28; F16B 41/005
(Continued)

(56) References Cited

U.S. PATENT DOCUMENTS 1,281,709 A * 10/1918 Thomassen ............. F16B 39/12
411/222
1,459,548 A * 6/1923 Morison ................. F16B 37/14
29/508
(Continued)

FOREIGN PATENT DOCUMENTS

CN 202073902 U 12/2011
GB 1482510 A 10/1977
(Continued)

OTHER PUBLICATIONS

The International Search Report (ISR) and Written Opinion of the International Searching Authority (ISA) for International Application No. PCT/US2017/018152; Publication No. WO 2017/143050 A1; dated Mar. 29, 2017.

Primary Examiner — Roberta S Delisle
(74) Attorney, Agent, or Firm — Harter Secrest & Emery LLP

(57) ABSTRACT

An improved fastener comprising a fastener body orientated about a central axis and having a tool-engaging portion, a threaded fastening portion and a shroud-receiving portion having an inwardly facing annular groove orientated transverse to the central axis; a shroud concentrically mounted on the shroud-receiving portion to rotate relative to the fastener body under an applied external torque and having an axially-buckled radially-extending annular protrusion extending outwardly transverse to the central axis and disposed in the inwardly facing annular groove of the shroud-receiving portion of the body; the axially-buckled radially-extending annular protrusion of the shroud and the annular groove of the shroud-receiving portion of the body forming a shroud-retaining element restraining the shroud from movement in at least a first axial direction along the central axis.

14 Claims, 2 Drawing Sheets

(51) Int. Cl.
*F16B 37/14* (2006.01)
*F16B 39/12* (2006.01)
*F16B 39/28* (2006.01)
*F16B 41/00* (2006.01)

(52) U.S. Cl.
CPC .............. *F16B 39/02* (2013.01); *F16B 39/12* (2013.01); *F16B 39/28* (2013.01); *F16B 41/005* (2013.01)

(58) Field of Classification Search
USPC .................................. 411/402, 429, 430, 432
See application file for complete search history.

(56) References Cited

U.S. PATENT DOCUMENTS

| | | | | |
|---|---|---|---|---|
| 3,299,933 | A * | 1/1967 | Akashi | F16B 37/14 29/511 |
| 3,431,811 | A * | 3/1969 | Yonkers | F16B 37/00 411/432 |
| 3,696,646 | A | 10/1972 | Loscalzo | |
| 4,295,766 | A * | 10/1981 | Shaw | F16B 37/14 411/113 |
| 4,302,137 | A | 11/1981 | Hart | |
| 4,645,397 | A | 2/1987 | Howe | |
| RE33,114 | E * | 11/1989 | Chiavon | B25B 13/485 81/121.1 |
| 5,228,250 | A | 7/1993 | Kesselman | |
| 5,454,675 | A * | 10/1995 | DeHaitre | F16B 33/004 411/303 |
| 5,827,029 | A * | 10/1998 | Denman | F16B 41/005 411/373 |
| 6,540,460 | B2 * | 4/2003 | Miranda | F16B 31/021 411/372.5 |
| 6,935,825 | B2 * | 8/2005 | Winker | F16B 37/14 411/429 |
| 7,351,020 | B1 * | 4/2008 | Notaro | F16B 23/0007 411/430 |
| 7,445,414 | B1 * | 11/2008 | Notaro | F16B 23/0007 411/432 |
| 8,888,430 | B2 | 11/2014 | Groppo | |
| 2003/0053886 | A1 | 3/2003 | Ueno | |
| 2011/0116891 | A1 | 5/2011 | Notaro et al. | |
| 2017/0234356 | A1 * | 8/2017 | Bielecki | F16B 23/0007 411/190 |

FOREIGN PATENT DOCUMENTS

| | | |
|---|---|---|
| GB | 2179416 A | 3/1987 |
| GB | 2256821 A | 12/1992 |
| GB | 2374641 A | 10/2002 |
| GB | 2400061 A | 10/2004 |
| WO | 9702435 A1 | 7/1996 |
| WO | 0109527 A1 | 8/2001 |
| WO | 2004001237 A1 | 12/2003 |
| WO | 2015159034 A2 | 10/2015 |

* cited by examiner

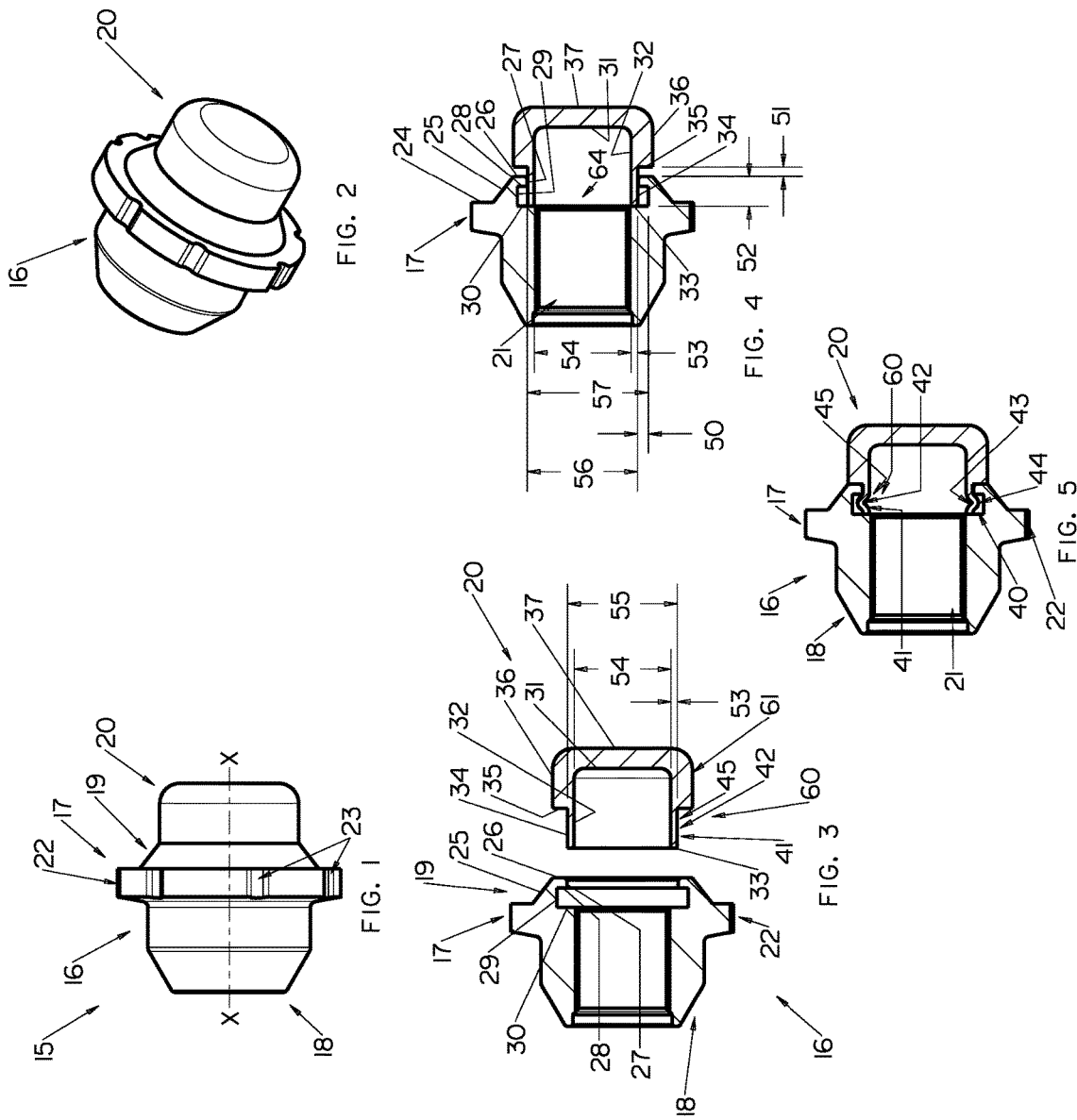

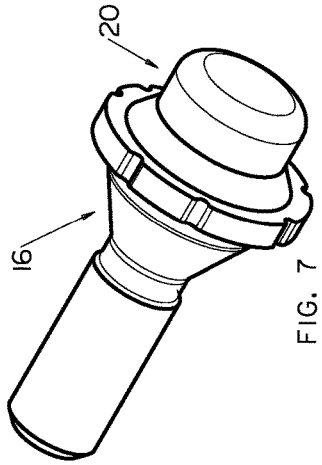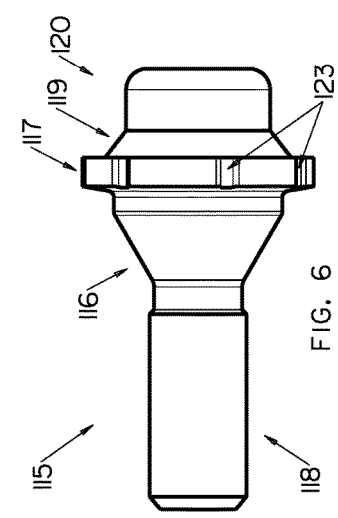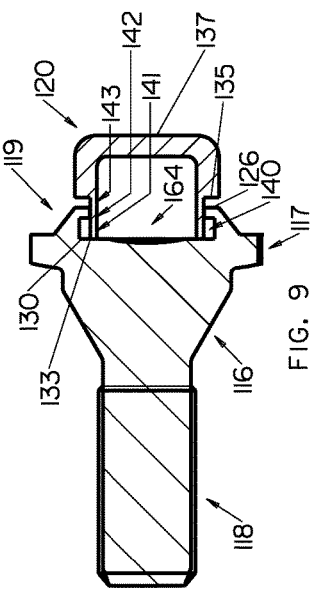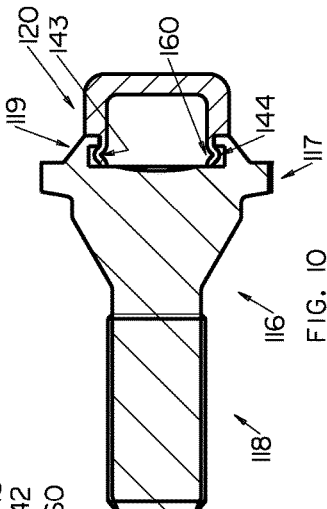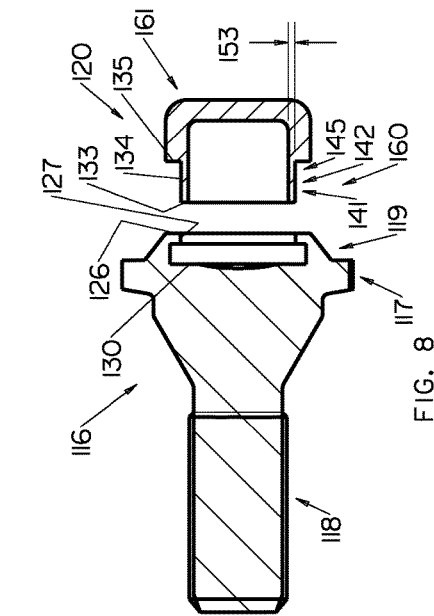

US 10,280,966 B2

HIGH SECURITY FASTENER WITH INTERNAL SHROUD BUCKLED RETAINER

TECHNICAL FIELD

The present invention relates to high security fasteners, and more particularly to a high security fastener having a shroud buckled retainer.

BACKGROUND ART

Locking wheel nuts and wheel bolts are commonly used to attach wheels to axel hub assemblies of automobiles and other vehicles. These fasteners are designed with security features that are intended to thwart theft by rendering the fasteners difficult to remove with conventional tools. In particular, the fasteners do not have the usual hexagonal head pattern found on conventional nuts and bolts and instead have smooth cylindrical sidewalls that cannot be gripped by standard wrenches. Fastener removal requires the use of a special security tool having a unique key pattern that matches a corresponding groove pattern formed in the fastener end face.

Additional security can be obtained by fitting a free-spinning shroud or cap over the security fasteners cylindrical sidewalls, such that the shroud is in concentric relationship therewith. The shroud discourages the use of theft devices that could otherwise be used to grip the sidewalls and remove the fastener without an authorized security tool. Because the shroud substantially surrounds all exposed surfaces of the sidewalls, no rotational purchase can be obtained in the fastener. The theft device can only engage the shroud, which freely spins under action of the theft device while the main body of the fastener remains stationary.

Various systems have been developed for rotationally retaining the shroud or spin cap on the fastener body. For example, U.S. Pat. No. 7,445,414, entitled "High Security Fastener Constructions," is directed to a shroud fastener design having a shroud retaining system for retaining the shroud for rotation relative to the fastener body. The entire contents and disclosure of U.S. Pat. No. 7,445,414 are incorporated herein by reference. International Patent Publication No. WO2004/001237, entitled "Screw-Threaded Fastening," is directed to a wheel nut having a fastener body and a spin cap or shroud which is retained on the fastener body by means of an outwardly flared end portion of the fastener body which is received within an undercut triangular groove in the inner surface of the cap.

BRIEF SUMMARY

With parenthetical reference to corresponding parts, portions or surfaces of the disclosed embodiment, merely for the purposes of illustration and not by way of limitation, an improved fastener (15, 115) is provided comprising a fastener body (16, 116) orientated about a central axis (x-x); the fastener body having a tool-engaging portion (17, 117) to which a driving torque may be applied and a threaded fastening portion (18, 118) configured and arranged to mate with a corresponding threaded element; the fastener body having a shroud-receiving body portion (19, 119) orientated about the central axis; a shroud (20, 120) concentrically mounted on the shroud-receiving body portion and having an outer surface (34, 134) facing an inner surface (27, 127) of the shroud-receiving body portion; the shroud being supported in rotatable relationship with the shroud-receiving body portion such that the shroud will rotate relative to the fastener body under an applied external torque prior to the fastener body rotating when the fastener is engaged with an external structure at a design installation torque; the inner surface of the shroud-receiving body portion comprising an annular groove (40, 140) orientated transverse to the central axis; the shroud comprising an axially-buckled radially-extending annular protrusion (43, 143) extending outwardly transverse to the central axis and disposed in the annular groove of the shroud-receiving body portion; and the axially-buckled radially-extending annular protrusion of the shroud and the annular groove of the shroud-receiving body portion forming a shroud-retaining element restraining the shroud from movement in at least a first axial direction along the central axis.

The shroud may comprise a thin-walled cylindrical tubular portion (60, 160) having a shoulder with an annular shroud shoulder surface (35, 135), the shroud-receiving body portion may comprise an annular flange portion having an annular first body surface (26, 126), and the shroud shoulder surface may face the first body surface. The first body surface (26, 126) of the shroud-receiving body and the shroud shoulder surface (35, 135) of the shroud may be in an opposing orientation and form a second shroud-retaining element restraining the shroud from movement in at least a second axial direction along the central axis opposite to the first axial direction along the central axis.

The shroud may comprise a thin-walled cylindrical tubular portion (60, 160) and the shroud-retaining element may be formed by an axial buckle of the thin-walled cylindrical tubular portion of the shroud outward radially into the annular groove of the shroud-receiving body. The axial buckle of the thin-walled cylindrical tubular portion of the shroud may be formed by a compressive force applied axially to the thin-walled cylindrical tubular portion of the shroud by an annular end surface (30, 130) of the shroud-receiving body. The thin-walled cylindrical tubular portion may comprise an annular shroud end surface (33, 133) and the compressive force applied axially to the thin-walled cylindrical tubular portion of the shroud by the end surface of the shroud-receiving body may impact the annular shroud end surface.

The axially-buckled radially-extending annular protrusion of the shroud may comprise a substantially arch-shaped axially-buckled radially-extending annular protrusion extending outwardly transverse to the central axis and having at least an annular apex (44, 144) disposed in the annular groove of the shroud-receiving body portion. The substantially arch-shaped axially-buckled radially-extending annular protrusion of the shroud may be substantially U-shaped or V-shaped. The shroud may comprise a thin-walled cylindrical tubular portion (60, 160) having an annular crease and the annular apex (44, 144) of the shroud-retaining element may be formed by an axial buckle of the thinned tubular cylindrical portion of the shroud at the annular crease radially outward into the annular groove of the shroud-receiving body portion. The substantially arch-shaped axially-buckled radially-extending annular protrusion of the shroud may be asymmetrical.

The fastener body may comprise a lock nut (16) or a lock bolt (116). The shroud-receiving body portion may comprise an annular body end surface (30, 130), the thin-walled cylindrical tubular portion may comprises an annular shroud end surface (33, 133), and the annular body end surface may face the annular shroud end surface. The shroud may comprise a thinned tubular cylindrical portion axially aligned with the annular groove of the shroud-receiving body portion and the shroud-retaining element may be formed by an axial buckle of the thinned tubular cylindrical portion of the shroud radially outward into the annular groove of the shroud-receiving body portion. The groove of the shroud-receiving body portion may be substantially U-shaped or V-shaped.

In another aspect, a method of forming a fastener is provided comprising the steps of: providing a fastener body (16, 116) orientated about a central axis (x-x); the fastener body having a tool engaging portion (17, 117) to which a driving torque may be applied, a threaded fastening portion (18, 118) configured and arranged to mate with corresponding threaded element, and a shroud-receiving body portion (19, 119) orientated about the central axis; providing a shroud (20, 120); mounting the shroud concentrically in the shroud-receiving body portion such that an outer surface of the shroud faces an inner surface of the shroud-receiving body portion; axially aligning an annular groove (40, 140) in the inner surface of the shroud receiving body with a buckling portion (60, 160) of the shroud; restraining the shroud or the fastener body from moving in a first direction along the central axis; applying an axial force to the other of the shroud or the shroud-receiving body in the first direction such that the buckling portion of the shroud buckles outwardly into the annular groove of the shroud-receiving body under the applied axial force to form a axially-buckled radially-extending annular protrusion (43, 143) extending transverse to the central axis disposed in the annular groove; such that the shroud is restrained from movement in at least one axial direction along the central axis.

The axially-buckled radially-extending annular protrusion of the shroud may comprise a substantially arch-shaped axially-buckled radially-extending annular protrusion extending outwardly transverse to the central axis and having at least an annular apex (44, 144) disposed in the annular groove of the shroud-receiving body portion.

BRIEF DESCRIPTION OF THE DRAWINGS

FIG. 1 is a side elevation view of a first embodiment of an improved security fastener.

FIG. 2 is a perspective view of the security fastener shown in FIG. 1.

FIG. 3 is a pre-assembled exploded longitudinal vertical sectional view of the security fastener shown in FIG. 1.

FIG. 4 is a pre-assembled longitudinal vertical sectional view of the security fastener shown in FIG. 1.

FIG. 5 is a fully-assembled longitudinal vertical sectional view of the security fastener shown in FIG. 1.

FIG. 6 is a side elevation view of a second embodiment of an improved security fastener.

FIG. 7 is a perspective view of the security fastener shown in FIG. 6.

FIG. 8 is a pre-assembled exploded longitudinal vertical sectional view of the security fastener shown in FIG. 6.

FIG. 9 is a pre-assembled longitudinal vertical sectional view of the security fastener shown in FIG. 6.

FIG. 10 is a fully-assembled longitudinal vertical sectional view of the security fastener shown in FIG. 6.

DETAILED DESCRIPTION OF THE EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., crosshatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to FIGS. 1-5, an improved safety fastener is provided, a first nut-type embodiment of which is generally indicated at 15. Nut fastener 15 generally includes fastener body 16 and cap or shroud 20, which rotates about axis x-x relative to fastener body 16. Fastener body 16 includes tool engaging portion 17, threaded fastening portion 18, and shroud-retaining portion 19 within which shroud 20 is rotationally supported. Shroud 20 includes exposed end 61 and thin-walled cylindrical tubular post 60.

Threaded fastening portion 18 of fastener body 16 includes bore 21 that is internally threaded over a portion or all of its length. Nut fastener 15 may be installed in a wheel having a recess hole formed as a relatively deep cylindrical well. The wheel hole has an annular recess entrance and a wheel stud or post in the wheel hole, and fastener body 16 and fastening portion 18 are sized and installed such that the interior threads of inner bore 21 engage the corresponding exterior threads of the wheel stud in the wheel hole.

Tool engaging portion 17 of fastener body 16 extends radially outward between fastening portion 18 and shroud-retaining portion 19 and comprises side wall 22 that is substantially cylindrical in shape. Side wall 22 is formed with a key-receiving pattern that may be implemented as a set of circumferentially arranged lock pattern grooves 23. Lock pattern configurations that use formations of other grooves may also be used. As can be seen, lock pattern grooves 23 are visible on the annular front face 24 of tool engaging portion 17 that lies between side wall 22 and shroud 20. In order to impart lock pattern uniqueness, lock pattern grooves 23 may be patterned or configured in any suitable alternative manner, such as by employing a selected number of grooves and/or by varying other features thereof, such as the spacing between grooves and/or the width, length, depth, profile or other configuration or feature thereof. Such grooves are configured so that a corresponding key (no shown) may be used to engage lock pattern grooves 23. The key includes a socket and a drive portion and the entrance to the socket is formed with a key pattern that may be implemented as a set of circumferentially arranged key pattern lobes that are configured and arranged to engage the lock pattern grooves 23 when the socket is placed over the right end of shroud 20 of nut fastener 15. Thus, a key having a matching set of key pattern lobes may be used to engage lock pattern grooves 23 to actuate nut fastener 15 about axis x-x.

The security key is configured to fit within a gap space to engage the lock pattern and rotate nut fastener 15. Other tools either will not fit within the gap space or will not be able to properly engage and rotate nut fastener 15 when it is installed at its intended design installation torque. The size of the gap can be controlled by sizing the diameter of cylindrical sidewall 22 according to the diameter of the recess hole in which nut fastener 15 is employed. Tool engaging portion 17 is arranged so that sidewall 22 is within the wheel hole. In this position, the nut fastener's lock pattern is only exposed inside the recessed wheel hole entrance and access to the nut fastener's lock pattern is limited by the circumferential gap space between the lock pattern's outside diameter and the wheel hole's inside diameter. The ability of shroud 20 to spin relative to fastener body 16 and fastening portion 18 thereof provides a security feature that protects nut fastener 15 from being used as a purchase point for an unauthorized tools. Should an attempt be made to rotate nut fastener 15 by gripping the exposed end, cap 20 will tend to spin without any rotation being imparted to fastener body 16 and fastening portion 18 thereof.

Pre-assembled, as shown in FIG. 3, shroud 20 has a generally cylindrical configuration elongated along axis x-x, and is generally bounded by leftwardly-facing vertical circular surface 31, inwardly-facing horizontal cylindrical surface 32, leftwardly-facing vertical annular surface 33, outwardly-facing horizontal cylindrical surface 34, leftwardly-facing vertical annular surface 35, outwardly-facing horizontal cylindrical surface 36, and rightwardly-facing vertical circular surface 37. The left portion of surface 32 and surfaces 33 and 34 generally form a thin-walled hollow cylindrical post 60 of inner diameter 54, outer diameter 55 and thickness 53, and comprises distal end portion 41, medial portion 42 and proximate portion 45.

As shown in FIG. 3, retaining portion 19 of fastener body 16 is a specially configured cylindrical member elongated along axis x-x and is generally bounded by outwardly and rightwardly-facing frustoconical surface 25, rightwardly-facing vertical annular surface 26, inwardly-facing horizontal cylindrical surface 27, leftwardly-facing vertical annular surface 28, inwardly-facing horizontal cylindrical surface 29, and rightwardly-facing vertical annular surface 30. As shown, retaining portion 19 thereby defines inner bore 64, having inside diameter 56 at surface 27, which is approximately the same size as outside diameter 55 of shroud post 60, and specially configured internal annular groove 40, having outer diameter 57 at surface 29 and radial depth 50 from surface 27. Surfaces 28, 29 and the outer annular portion of surface 30 define inwardly facing annular groove 40 orientated transverse to axis x-x.

In the pre-assembled state shown in FIG. 4, post 60 of shroud 20 has been placed in inner bore 64 of retaining portion 19 of body 16 such that the leftwardly-facing surface 33 of post 60 abuts against the inner portion of the rightwardly-facing annular end face 30 of body 16. As shown, in this pre-assembled state, axial depth 52 of inner bore 64 of retaining portion 19 of body 16 is dimensioned to provide axial gap 51 between rightwardly-facing annular end face 26 of retaining portion 19 and leftwardly-facing annular end face 35 of shroud 20. When assembled as described below, axial gap 51 will disappear as post 60 of shroud 20 buckles outwardly into groove 40 and reduces the axial length along axis x-x of post 60 of shroud 20 from end face 35 to end face 33 of shroud 20.

To complete assembly of fastener 15, with distal end 41 of post 60 of shroud 20 placed within bore 64 of retaining portion 19 of body 16 such that leftwardly-facing annular surface 33 of post 60 of shroud 20 abuts against the inner annular portion of end face 30 of body 16, as shown in FIG. 4, an axial force is then applied with a ram to outer rightwardly-facing surface 37 of shroud 20 while fastener body 16 is held stationary in a press or the like. Such force is great enough to drive end face 33 of shroud 20 into opposed end face 30 of fastener body 16 and buckle medial portion 42 of post 60 into groove 40, as shown in FIG. 5, which depicts the fully assembled configuration of fastener 15. Thus, fastener body 16 and shroud 20 are specially formed such that applying a directed axial force to shroud 20 with a ram causes cylindrical portion 42 to buckle outwards into specially formed groove 40 in retaining portion 19. Post 60 has thickness 53 designed to buckle outwardly into groove 40 under the applied force to form buckled retaining arch 43. Annular end face 33 of shroud 20 and end face 30 of body 16 are in frictional contact such that end portion 41 of post 60 does not flare significantly outwards. Instead, medial portion 42 of post 60, which is axially inward from end face 33 of shroud 20, buckles into groove 40. When assembled, at least apex 44 of buckled arch 43 extends into groove 40, thereby retaining shroud 20 within the end of body 16 such that shroud 20 is free to rotate about center axis x-x of body 16 but is restrained from moving axially to the right out of retaining portion 19 and body 16. Thus, as shown in FIG. 5, substantially arched-shaped axially-buckled radially-extending annular protrusion 43 is formed, which extends outwardly transverse to central axis x-x and has at least an annular apex 44 disposed in annular groove 40 of retaining portion 19.

Shroud 20 is thereby mounted concentrically in retaining portion 19 of nut fastener 15 such that it does not move axially out of retaining portion 19 but is substantially free to rotate about axis x-x relative to fastener body 16. Although exterior surfaces 36 and 37 of shroud 20 are shown as being substantially cylindrical and circular, respectively, other shapes or contours could also be used, such as without limitation hexagonal, square or entirely cylindrical. Moreover, although shroud 20 is shown as being closed-ended on one side, alternatively it may have an open-ended configuration. If desired, shroud 20 may have a decorative finish to improve fastener appearance, including, but not limited to, nickel/chrome plating, silver or gray coatings.

As shown in FIGS. 3-5, annular groove 40 in retaining portion 19 has an annular ninety degree or squared first inner corner at the junction between surfaces 30 and 29, and an annular ninety degree or squared second inner corner at the junction between surfaces 29 and 28. As shown, groove 40 therefor comprises a generally square cross-sectional profile taken in a cross-sectional plane extending radially from central axis x-x. However, groove 40 may have other cross-sectional profiles. For example, without limitation, the groove may comprise a generally trapezoidal cross-sectional profile taken in a cross-sectional plane extending radially from central axis x-x.

While forming a substantially arched-shaped axially-buckled radially-extending annular protrusion which extends outwardly transverse to central axis x-x and has at least an annular apex disposed in an annular groove of the fastener body by applying a single axial force with a ram to the exposed end of the shroud while the fastener body is held stationary in a press has been described, more than a single axial ramming force may be applied. In addition, as another alternative, the force may be applied to the exposed left end of the fastener body while the shroud is help stationary in a press or the like.

Referring now to FIGS. 6-10, a bolt-type security fastener 115 according to a second example embodiment is shown. Bolt fastener 115 generally includes fastener body 116 and shroud 120, which rotates about axis x-x relative to fastener body 116. Fastener body 116 includes tool engaging portion 117, threaded shank 118 and shroud-retaining portion 119 within which shroud 120 is rotationally supported. Fastener 115 has most of the features of fastener 115 described above in connection with FIGS. 1-5. The major difference between fastener 15 and fastener 115 lies in the fact that fastening portion 118 of fastener 119 is a bolt-type fastener rather than nut type 19. Bolt fastener 115 is installed in a wheel hole such that shroud retaining portion 119 and shroud 120 are arranged to be exposed outside the entrance of the hole. The fastening end portion 118 of bolt fastener 115 includes a shank that is externally threaded over a portion or all of its length. The bolt fastener is mounted on wheels that have at least one fastener-receiving recess hole with threads corresponding to the threads of shank 118.

Shroud retaining portion 119 is of the same configuration as shroud retaining portion 19 and shroud 120 is of the same configuration as shroud 20. Thus, with distal end 141 of post 160 of shroud 120 placed within bore 164 of retaining portion 119 of body 116 such that leftwardly-facing annular surface 133 of post 160 of shroud 120 abuts against the inner annular portion of end face 130 of body 116 as shown in FIG. 9, an axial force is then applied with a ram to outer rightwardly-facing surface 137 of shroud 120 while fastener body 116 is held stationary in a press or the like. Such force is great enough to drive end face 133 of shroud 120 into opposed end face 130 of fastener body 116 and buckle medial portion 142 of post 160 into groove 140, as shown in FIG. 10, which depicts the fully assembled configuration of fastener 115. Thus, fastener body 116 and shroud 120 are specially formed such that applying a directed axial force to shroud 120 with a ram causes cylindrical portion 142 to buckle outwards into specially formed groove 140 in retaining portion 119. Post 160 has thickness 153 designed to buckle outwardly into groove 140 under the applied force to form buckled retaining arch 143. Annular end face 133 of shroud 120 and end face 130 of body 116 are in frictional contact such that end portion 141 of post 160 does not flare significantly outwards. Instead, medial portion 142 of post 160, which is axially inward from end face 133 of shroud 120, buckles into groove 140.

When assembled, at least apex 144 of buckled arch 143 extends into groove 140, thereby retaining shroud 120 within the end of body 116 such that shroud 120 is free to rotate about center axis x-x of body 116 but is restrained from moving axially to the right out of retaining portion 119 and body 116. Thus, as shown in FIG. 10, substantially arched-shaped axially-buckled radially-extending annular protrusion 143 is formed, which extends outwardly transverse to central axis x-x and has at least an annular apex 144 disposed in annular groove 140 of retaining portion 119. Opposed surface 126 of retaining portion 119 of body 116 and surface 135 of shroud 120, retain shroud 120 such that shroud 120 is free to rotate about center axis x-x of body 116 but is restrained from moving axially to the left.

The present invention contemplates that many changes and modifications may be made. Therefore, while forms of the improved fastener have been shown and described, and a number of alternatives discussed, persons skilled in this art will readily appreciate that various additional changes and modifications may be made without departing from the scope of the invention, as defined and differentiated by the following claims.

What is claimed is:

1. A fastener comprising:
   a fastener body orientated about a central axis;
   said fastener body having a tool-engaging portion to which a driving torque may be applied and a threaded fastening portion configured and arranged to mate with a corresponding threaded element;
   said fastener body having a shroud-receiving body portion orientated about said central axis;
   a shroud concentrically mounted on said shroud-receiving body portion and having an outer surface facing an inner surface of said shroud-receiving body portion;
   said shroud being supported in rotatable relationship with said shroud-receiving body portion such that said shroud will rotate relative to said fastener body under an applied external torque prior to said fastener body rotating when said fastener body is engaged with an external structure at a design installation torque;
   said inner surface of said shroud-receiving body portion comprising an annular groove orientated transverse to said central axis;
   said shroud comprising an axially-buckled radially-extending annular protrusion extending outwardly transverse to said central axis and disposed in said annular groove of said shroud-receiving body portion; and
   said axially-buckled radially-extending annular protrusion of said shroud and said annular groove of said shroud-receiving body portion forming a shroud-retaining element restraining said shroud from movement in at least a first axial direction along said central axis.

2. The fastener of claim 1, wherein said shroud comprises a thin-walled cylindrical tubular portion having an annular shoulder with an annular shroud shoulder surface, said shroud-receiving body portion comprises an annular flange portion having an annular first body surface, and said shroud shoulder surface faces said first body surface.

3. The fastener set forth in claim 2, wherein said first body surface of said shroud-receiving body portion and said shroud shoulder surface of said shroud are in an opposing orientation and form a second shroud-retaining element restraining said shroud from movement in at least a second axial direction along said central axis opposite to said first axial direction along said central axis.

4. The fastener set forth in claim 1, wherein said shroud comprises a thin-walled cylindrical tubular portion and said shroud-retaining element is formed by an axial buckle of said thin-walled cylindrical tubular portion of said shroud outward radially into said annular groove of said shroud-receiving body.

5. The fastener set forth in claim 4, wherein said axial buckle of said thin-walled cylindrical tubular portion of said shroud is formed by a compressive force applied axially to said thin-walled cylindrical tubular portion of said shroud by an annular end surface of said shroud-receiving body portion.

6. The fastener set forth in claim 5, wherein said thin-walled cylindrical tubular portion comprises an annular shroud end surface and said compressive force applied axially to said thin-walled cylindrical tubular portion of said shroud by said end surface of said shroud-receiving body portion impacts said annular shroud end surface.

7. The fastener set forth in claim 1, wherein said axially-buckled radially-extending annular protrusion of said shroud comprises a substantially arch-shaped axially-buckled radially-extending annular protrusion extending outwardly transverse to said central axis and having at least an annular apex disposed in said annular groove of said shroud-receiving body portion.

8. The fastener set forth in claim 7, wherein said substantially arch-shaped axially-buckled radially-extending annular protrusion of said shroud is substantially U-shaped or V-shaped.

9. The fastener set forth in claim 7, wherein said shroud comprises a thin-walled cylindrical tubular portion having an annular crease and said annular apex of said shroud-retaining element is formed by an axial buckle of said thinned tubular cylindrical portion of said shroud at said annular crease radially outward into said annular groove of said shroud-receiving body portion.

10. The fastener set forth in claim 7, wherein said substantially arch-shaped axially-buckled radially-extending annular protrusion of said shroud is asymmetrical.

11. The fastener set forth in claim 1, wherein said fastener body comprises a lock nut or a lock bolt.

12. The fastener of claim 1, wherein said shroud-receiving body portion comprises an annular body end surface, said thin-walled cylindrical tubular portion comprises an annular shroud end surface, and said annular body end surface faces said annular shroud end surface.

13. The fastener set forth in claim 1, wherein said shroud comprises a thinned tubular cylindrical portion axially aligned with said annular groove of said shroud-receiving body portion and said shroud-retaining element is formed by an axial buckle of said thinned tubular cylindrical portion of said shroud radially outward into said annular groove of said shroud-receiving body portion.

14. The fastener set forth in claim 1, wherein said groove of said shroud-receiving body portion is substantially U-shaped or V-shaped.

* * * * *